US011061387B2

(12) United States Patent
Shi

(10) Patent No.: US 11,061,387 B2
(45) Date of Patent: Jul. 13, 2021

(54) DISPATCHER SYSTEM FOR SEMICONDUCTOR MANUFACTURING PLANT

(71) Applicant: Weiping Shi, College Station, TX (US)

(72) Inventor: Weiping Shi, College Station, TX (US)

(73) Assignee: SMARTFABS CORPORATION, College Station, TX (US)

( * ) Notice: Subject to any disclaimer, the term of this patent is extended or adjusted under 35 U.S.C. 154(b) by 179 days.

(21) Appl. No.: 16/558,070

(22) Filed: Aug. 31, 2019

(65) Prior Publication Data

US 2020/0073372 A1 Mar. 5, 2020

Related U.S. Application Data

(60) Provisional application No. 62/727,511, filed on Sep. 5, 2018.

(51) Int. Cl.

| | |
|---|---|
| *G05B 19/418* | (2006.01) |
| *G06F 9/48* | (2006.01) |
| *G06F 9/50* | (2006.01) |
| *G06F 9/54* | (2006.01) |
| *G06F 9/455* | (2018.01) |
| *G06F 16/2458* | (2019.01) |
| *G06F 16/242* | (2019.01) |

(52) U.S. Cl.
CPC ... *G05B 19/41865* (2013.01); *G06F 9/45558* (2013.01); *G06F 9/4881* (2013.01); *G06F 9/5083* (2013.01); *G06F 9/541* (2013.01); *G06F 16/2433* (2019.01); *G06F 16/2458* (2019.01); *G06F 2009/4557* (2013.01)

(58) Field of Classification Search
None
See application file for complete search history.

(56) References Cited

U.S. PATENT DOCUMENTS

| 7,003,367 | B2 * | 2/2006 | Cheng | G05B 19/41865 |
| | | | | 700/121 |
| 10,860,008 | B2 * | 12/2020 | You | G05B 19/41865 |
| 2006/0064190 | A1 * | 3/2006 | Wang | G06Q 10/06 |
| | | | | 700/102 |
| 2012/0197868 | A1 * | 8/2012 | Fauser | G06F 16/2471 |
| | | | | 707/714 |

(Continued)

*Primary Examiner* — Ryan A Jarrett
(74) *Attorney, Agent, or Firm* — Zhong Law, LLC

(57) ABSTRACT

A dispatcher system associated with a manufacture execution system (MES) of a plant, where the MES uses a production database storing a table containing state information of a plurality machines in the plant to manage operation of the plurality of machines, the dispatcher system including a cache device to store a random accessible data sheet mapped to the table; and a processing device to provide a user interface to receive a dispatch application constructed based on a plurality of dispatch rules, the dispatch application comprising a database command directed to access the state information stored in the production database, convert the database command into a key-based search instruction in a target programming language, execute the key-based search instruction using a key to access the random accessible data sheet to generate a production plan, and issue the production plan to the MES to manage the operation of the plurality of machines.

20 Claims, 8 Drawing Sheets

(56) References Cited

U.S. PATENT DOCUMENTS

2015/0153723 A1* 6/2015 Raviola ................ G06F 16/219
 700/97
2016/0026735 A1* 1/2016 Cereghino .............. G06F 16/18
 707/769

* cited by examiner

US 11,061,387 B2

DISPATCHER SYSTEM FOR SEMICONDUCTOR MANUFACTURING PLANT

RELATED APPLICATION

This application claims priority to U.S. Provisional Application 62/727,511 filed Sep. 5, 2018, the content of which is incorporated by reference in its entirety.

TECHNICAL FIELD

The present disclosure relates to a system and method to control the manufacture process of plants, in particular, to a dispatcher system that may generate a production plan for a manufacturing execution system of the plant.

BACKGROUND

A plant may include different types of machines to perform a series of steps of a manufacturing process that produces the end products. For example, the manufacture process to fabricate semiconductor products may include the steps of wet clean, photolithography, ion implantation, dry etching, wet etching, plasma ashing, thermal treatments, chemical vapor deposition (CVD), physical vapor deposition (PVD), molecular beam epitaxy (MBE), electrochemical deposition (ECD), chemical-mechanical planarization (CMP), wafer testing, and wafer back grinding. Each of these steps (or sub-steps) may be performed once or repeatedly during the manufacture process. Each step may be performed by one or more semiconductor manufacture machines (or groups of machines), and each machine may participate in one or more steps. Thus, a piece of raw wafer may undergo the steps (and sub-steps) of the manufacture process to produce the eventual products (e.g., the ICs).

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
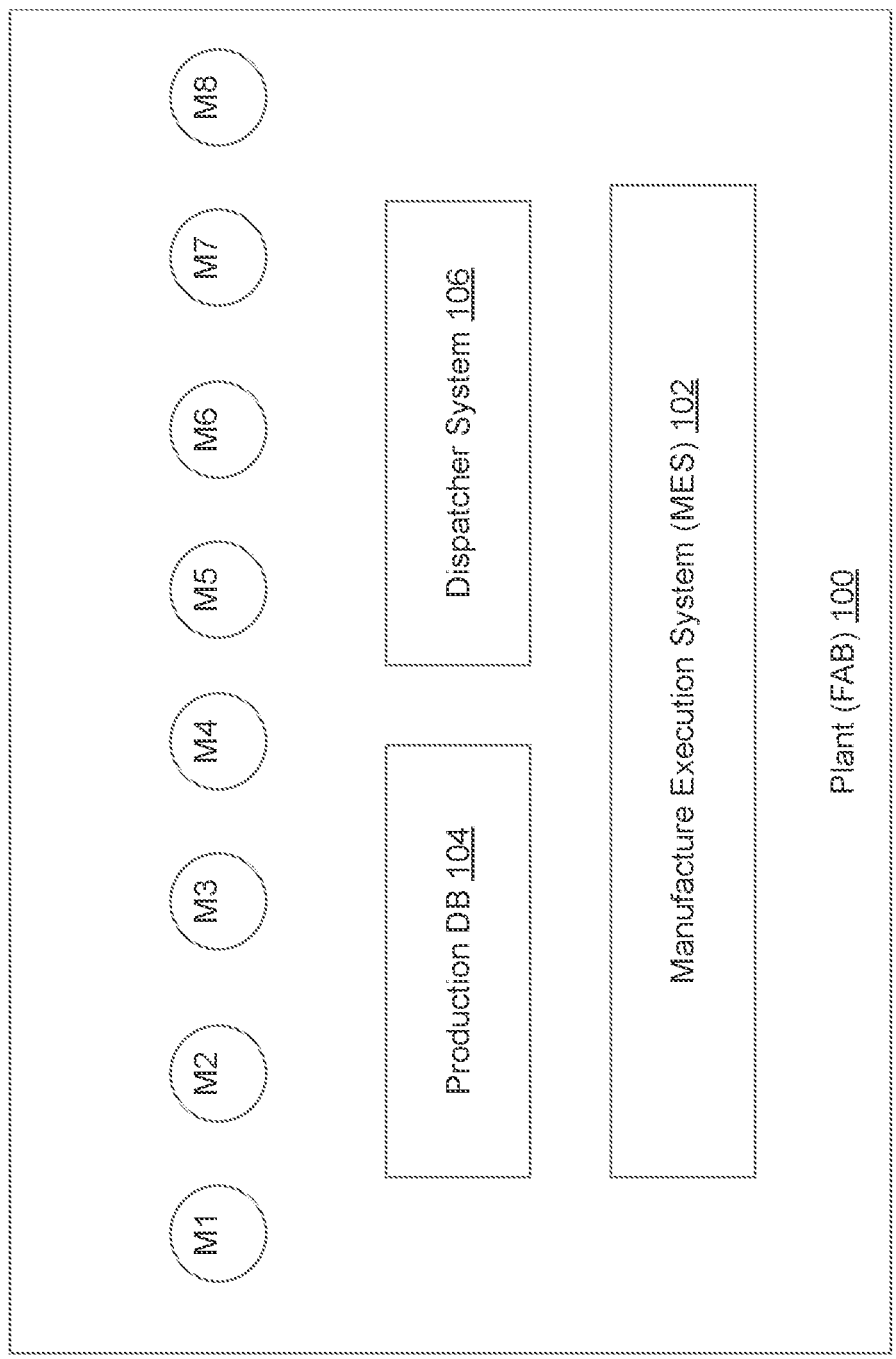
FIG. 1 illustrates a semiconductor manufacture plant according to an implementation of the present disclosure.

The plant can be a semiconductor plant, an LCD/LED plant, a package plant, or any plants that manufacture end products. In one particular example, the plant may be a semiconductor manufacture plant (referred to as a FAB). For the conciseness of description, implementations of the disclosure are described in the context of a semiconductor plant while it is understood that the implementations can be applied to other types of manufacture plants. The manufacture parts can be semiconductor wafers that undergo different manufacture steps to produce integrated circuits (ICs). These ICs can be the final products of the FAB. Normally, an apparatus may carry up to 25 semiconductors wafers that can be processed and transported together. The wafers in the apparatus are referred to as a wafer lot.

A semiconductor manufacture plant may utilize thousands of machines to produce hundreds of IC products concurrently through one or more manufacture processes. Each manufacture process may include hundreds of steps (or sub-steps) needed for fabricating these products. Different types of machines may be deployed for different steps. A same type of machines can also be utilized to perform different steps in the manufacture process. Thus, the production capacity of a machine may be divided to meet the demands to perform different steps of the manufacture process, and the processing of each step may be carried out by a group of machines with varying capacity assigned to the step.

The operation of the plant may be controlled by a manufacture execution system (MES) using information stored in a production database. The production database may contain a table including the positions of each wafer or wafer lot and the processing data. The processing data may include the state of the machine including wafers or wafer lots waiting to be processed at the machine, the current processing step being performed by the machine, and the portion of capacity of the machine allocated to the step.

A manufacture execution system (MES) may include a processing device (e.g., a central processing unit (CPU)) that may be programmed to issue a sequence of commands to machines or groups of machines in the FAB, where the commands control the operation of these machines in the FAB. A sequence of commands is herein referred to as a production plan for the machine. The MES may issue commands and production plans to a server or to a human operator for execution. For example, the commands may determine the wafers or wafer lots delivered to each machine based on the current state of the machines. The state of the machine may include, but not limited to, wafers or wafer lots waiting to be processed at the machine, the current processing step being performed by the machine, and the portion of capacity of the machine allocated to the step. Each machine may have a capacity that may be divided (e.g., by time sharing) to perform different processing steps. The commands may also determine portions of the machine capacity allocated to different processing steps.

In some implementations, the MES may include or otherwise be connected to a dispatcher system that may provide a user interface for a programmer to generate a production plan for the MES. The program when executed uses the information stored in the production database and wafers (or wafer lots) delivered to the plant to generate the production plan. The generated production plan may be tested through a simulation process before being executed. In some implementations, the dispatcher system may support programs written in database commands (e.g., SQL database commands). The database commands may operate directly on the production database. The program may be a script containing the database commands. The execution of the database commands are slow and inefficient because the production database is a separate system connected to the MES through a network. A complicated operation may require the combination of multiple database commands. This complication may require multiple round trips between MES and the production database and may further increase the execution time of the database commands.

To overcome the above-identified and other deficiencies associated with execution of database commands, implementations of the present disclosure provide a dispatcher system including an intermediate layer between the layer of the production database and a programming layer accessible by the user. The intermediate layer may cache the current state of the production database in a local cache storage, convert the table containing the current state of the production database into a key-indexed random access data sheet, and provide another application programming interface for a program written in a general-purpose programming language to access the database commands. Thus, instead of accessing the production database directly using the database commands, implementations of the disclosure access contents of the production database through the intermediate layer that can significantly improve the speed and efficiency to generate the production plan, thereby improving the efficiency of the operation of the FAB.

FIG. 1 illustrates a semiconductor manufacture plant 100 according to an implementation of the disclosure. Plant 100 may include multiple machines (e.g., M1-M8) for processing and producing semiconductor products (e.g., integrated circuits). Plant 100 may further include a manufacture execution system (MES) 102 that may receive and execute production plans including commands for controlling the operations of these machines M1-M8. Plant 100 may also include a production database 104 connected to MES 102 through a network. Production database 104 may store tables containing the current states of plant 100. The current states may include, but not limited to, wafers or wafer lots waiting to be processed at the machine, the current processing step being performed by the machine, and the portion of capacity of the machine allocated to the step.

A dispatcher system 106 associated with MES 102 may provide a user interface through which a user may, based on information stored in production database 104, construct a dispatch application using a set of dispatch rules. The dispatch application when executed by MES 102 may generate production plans for machines M1-M8. Instead of directly programming using database commands (e.g., SQL database commands) operating on production database 104, dispatcher system 106 may include an intermediate layer to facilitate the programming of MES 102 as described in detail in FIGS. 2-6. Thus, the program produced through dispatcher system 106 may encode the set of dispatch rules in a more efficient way than current implementations.

Figure 8:
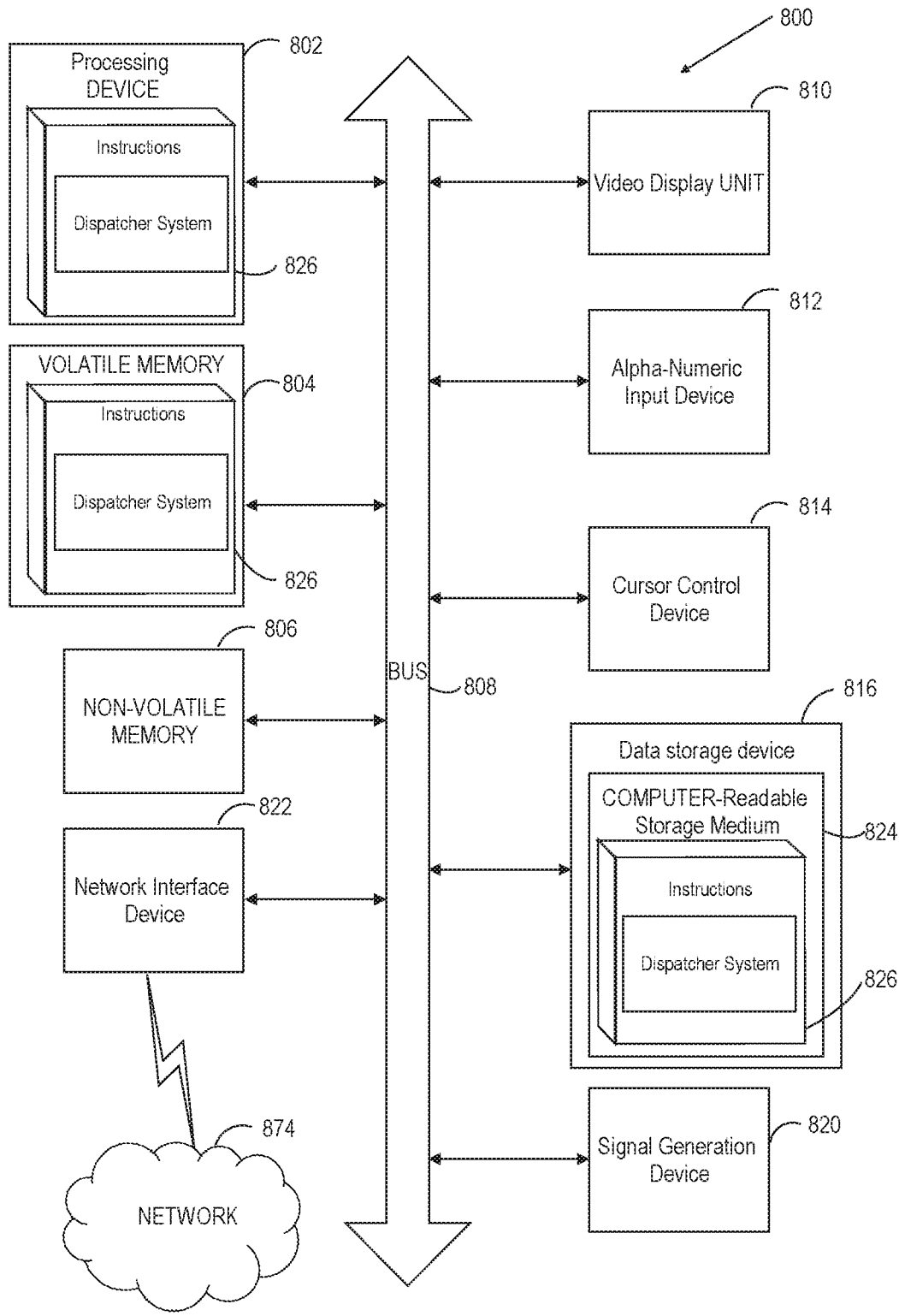
FIG. 8 depicts a block diagram of a computer system operating in accordance with one or more aspects of the present disclosure.

In one implementation, MES 102 can include a computer system (as shown in FIG. 8) including a processing device (e.g., a central processing unit (CPU)). MES 102 may also include a storage device (not shown) to store information associated with machines. Dispatcher system 106 can be a separate computer system similar to the one of MES 102 including a processing device and a storage device. In another implementation, dispatcher system 106 can be a software application implemented to be executed by the processing device of MES 102.

Figure 2:
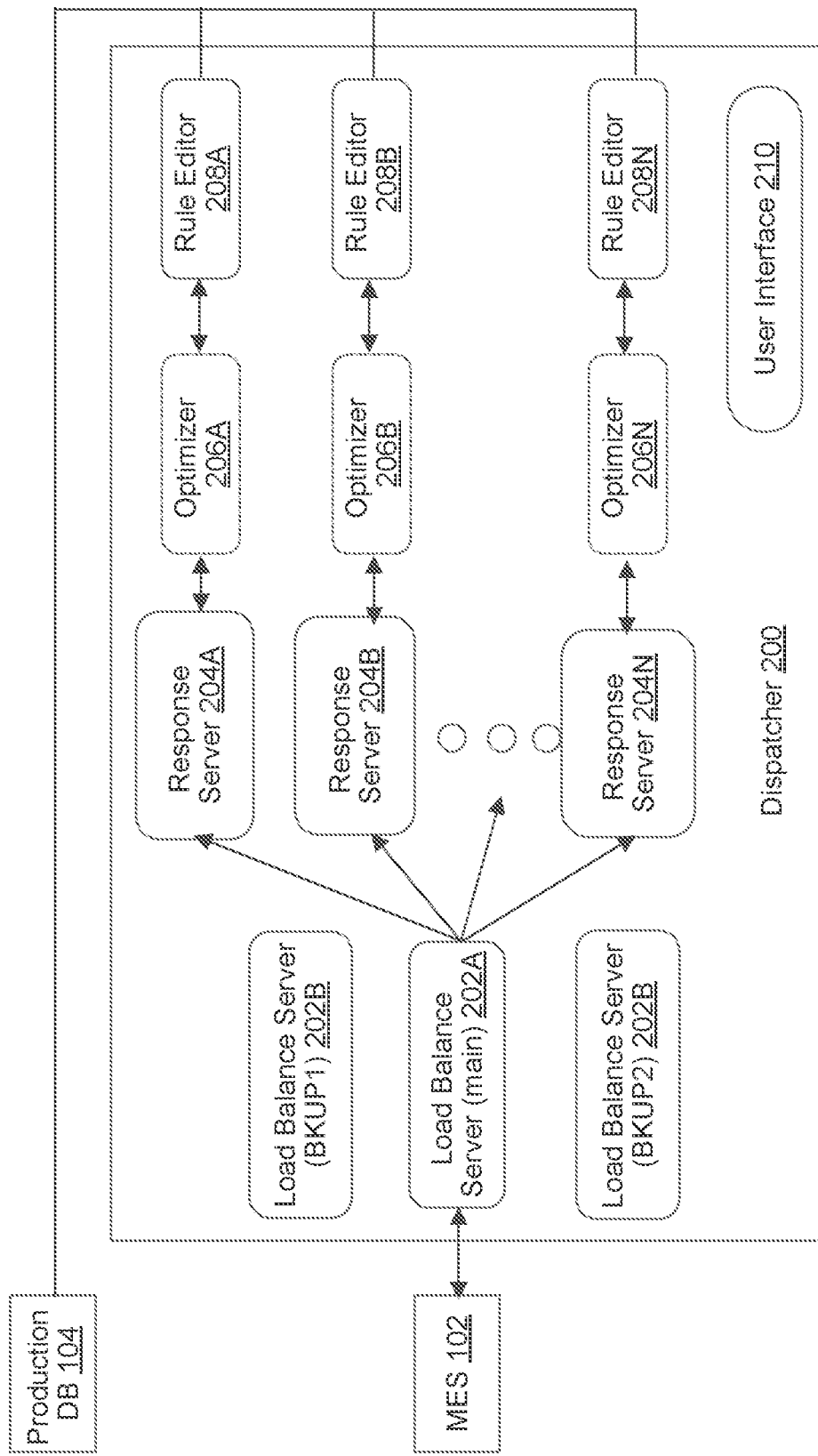
FIG. 2 illustrates a dispatcher system according to an implementation of the disclosure.

Dispatcher system 106 can be implemented in a variety of configurations using a variety of components. FIG. 2 illustrates a dispatcher system 200 according to an implementation of the disclosure. Referring to FIG. 2, dispatcher system 200 may be connected to or otherwise associated with MES 102 and production database 104. Dispatcher system 200 may allow a user to control the operation of MES 102 using a dispatch application encoding a set of dispatch rules. To this end, dispatcher system 200 may include a user interface 210 through which the user may interact with rule editors 208A-208N. In one implementation, dispatcher system 200 may include one rule editor through which the user may code the dispatch application that may control MES 102. In another implementation, dispatcher system 200 may include multiple rule editors, where each of the rule editors may be responsible to generate the dispatch applications for one or more machines in the plant. Rather than coding in a database command programming environment (e.g., MySQL, Oracle etc.), each of rule editors 208A-208N provides a general-purpose programming environment with accesses to the database commands through an intermediate layer. This software architecture may provide ease of programming and efficiency of execution. In one implementation, rule editor 208A-208N, through user interface 210 may provide the user with graphic representations (e.g., blocks) each corresponding to a dispatch rule. The user may choose any number of blocks (thus the corresponding dispatch rules) and arrange the blocks according to an order, where the order of blocks represent the order to perform the corresponding functions in a dispatch rule. Details of rule editors 208A-208N and the associated intermediate layer are described in conjunction with FIG. 6.

The dispatcher system may also include other components that may help further improve the performance of the execution of dispatch application. In addition to rule editors 208A-208N, as shown in FIG. 2, dispatcher system 200 may include one or more load balance server 202A, 202B, one or more response servers 204A-204N, and optionally, one or more optimizers 206A-206N. The user may use one or more rule editors 208A-208N to construct the dispatch application based on a set of dispatch rules. The program may be written in a general-purpose programming language such as, for example, C, C++, Java, and Python. One or more rule editors 208A-208B may include an application programming interface (API) that maps database commands (e.g., SQL commands) to a library of functions callable by the program. Since the dispatch application may be compiled by a compiler into machine-executable code, or alternatively, converted by an interpreter into bytecodes executable by a virtual machine, the execution of the program can be much more efficient and faster than the direct execution of the database commands in a script.

In one implementation, the rule editor may provide the user with visually-intuitive user interface for constructing the dispatch application. The user interface may include a list of graphic representations such as, for example, blocks with directional connectors. Each block may correspond to a function, and a series of connected blocks may correspond to a dispatch rule. Each block may include one or more connectors. Each connector may correspond to an input or an output. Thus, if a first connector of a first block is connected to a second connector of a second block, the output of the first function represented by the first block is fed into the second function represented by the second block. Thus, the user may choose a number of blocks and connect the blocks using connectors in an order representing one or more dispatch rules.

Each block may correspond to a function. For example, a first block can represent a function to run a database query command to read from or write into a database (e.g., the production database); a second block can represent a function to perform a computation operation such as, for example, sorting data values, determining a maximum or a minimum among data values; a third block can represent a function to support debug and reporting such as, for example, print or store certain information at certain point of a rule or rules, or write the certain information to a file or a location in the production database; a fourth block can represent a function to instantiate a user-defined functions (or blocks) which can be constructed using the general-purpose programming language. The user-defined functions may give the user additional flexibility to define rules using functions beyond those defined by the database commands.

In some implementations, dispatcher 200 may optionally provide one or more optimizers 206A-206N that may examine the code (machine-executable code or bytecodes) generated by one or more rule editors 208A-208N to perform code optimization. For example, when there are multiple options to achieve a final result (e.g., the destination of a wafer or wafer lot), one or more optimizers 206A-206N may determine the combination of database commands and functions that require the least amount of execution time or computing resources to achieve the optimization. In another implementation, one or more optimizers 206A-206N may include the following operations: converting a table stored in production database 104 into a random access data structure ("data sheet"); providing an application programming interface (API) to access content in the data sheet which is encapsulated from the user; providing customized functions that allows manipulation of the data sheet as well as the table in the database. The data items in the table stored in the production database may be accessed through indices of the table, which is an indirect access. In contrast, the data sheet can be accessed using keys which can be any immutable data type such as strings, numbers, or tuples. Thus, each data item in the data sheet is paired with a corresponding key, and any data item in the data sheet may be directly accessed through the key. Thus, the access of data items in the data sheet is faster than through the indices of production database. The customized functions allow manipulation of data items in the data sheet and correspondingly in the production database in a high bandwidth fashion.

Some of the rules can be very complex and difficult to implement using database commands. For example, the determination of the best machine and part combination may require solving a complex linear programming (LP) problem. The optimizer may significantly reduce the time to solve the LP problem and allow real-time solution of the LP problem.

Each rule editor 208A-208N (and each optimizer) may be associated with a corresponding response server 204A-204N for executing the code (or optimized code) or bytecodes (or optimized bytecodes). In one implementation, response server 204A-204N may support a virtual machine for executing the bytecodes generated by the rule editor 208A-208N. The output generated by the response server 208A-208N executing the program can be production plans including commands to deliver wafers or wafer lots to certain machine. Response server 208A-208N may deliver the production plan to MES 102 and update the production database 104 based on the production plan.

Load balance servers 202A, 202B may monitor the workloads of response servers 204A-204N to ensure that the executions of dispatch applications are carried out by the response server 204A-204N with the least load, thus guaranteeing a quick response. In one implementation, load balance servers 202A, 202B may include a main balance server that is always on, and one or more back-up load balance servers 202B that are in a sleep state. Responsive to determination that main load balance server 202A becomes unavailable, dispatcher system 200 may wake up back-up load balance server 208B to start monitoring loads on response servers 204A-204N, thereby further improving the reliability by the redundancy of the back-up load balance servers.

Figure 3:
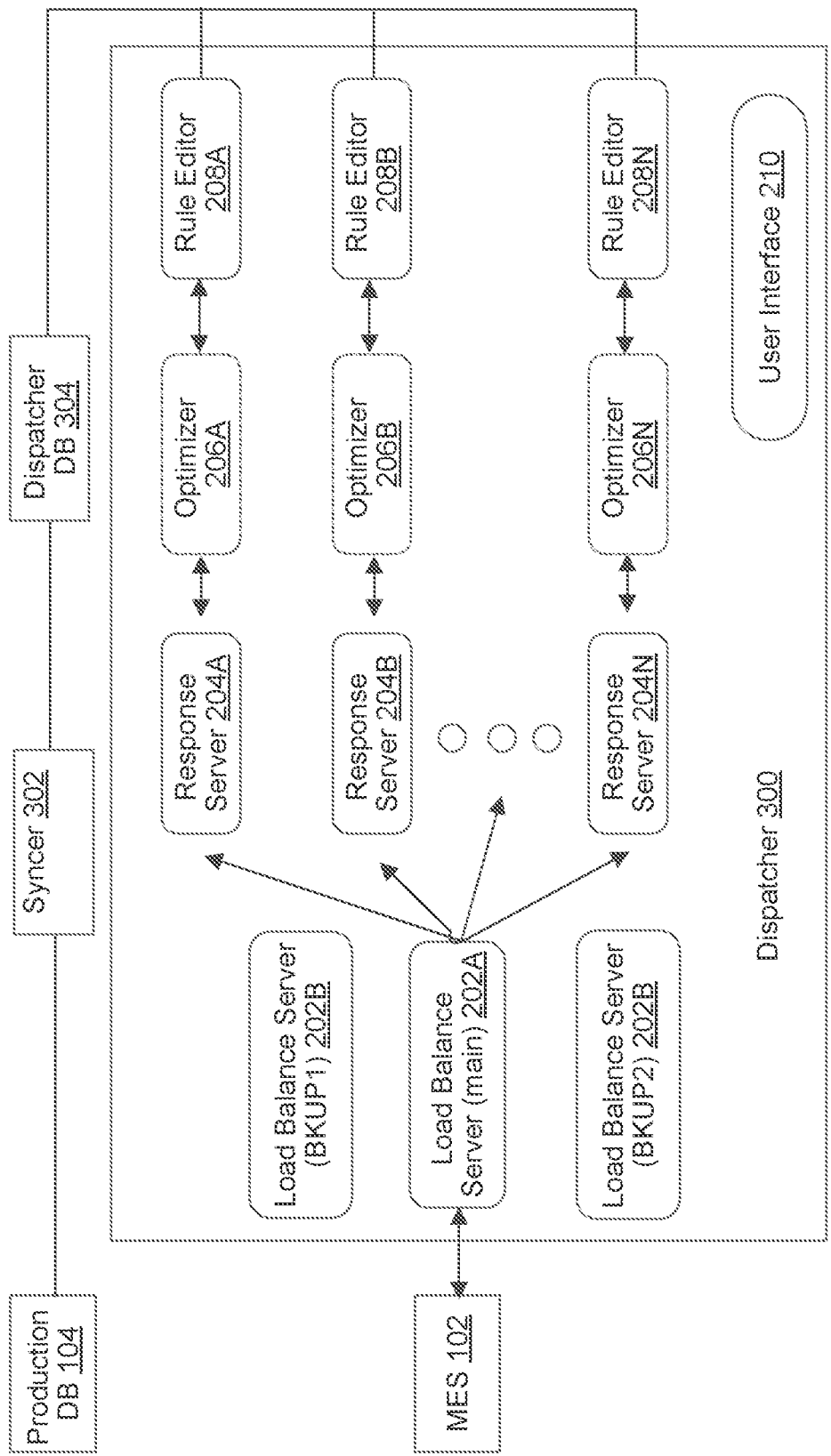
FIG. 3 illustrates a dispatcher system including a local cache database according to a second implementation of the disclosure.

The performance of the dispatcher system may be further improved by providing a copy of the content of production database in a local cache (referred to as the "dispatcher database"). FIG. 3 illustrates a dispatcher system 300 including a dispatcher database according to a second implementation of the disclosure. As shown in FIG. 3, dispatcher system 300 may further include a dispatcher database 304 that is connected to the production database 104 through a synchronizer 302. Dispatcher database 304 can be a local cache that can be accessed locally. The access time to dispatcher database 304 is much smaller than that to production database 104. In one implementation, synchronizer 302 may mirror content stored in production database 104 into dispatcher database 304 according to a schedule (e.g., periodically). This allows the content stored in production database 104 accessible through local dispatcher database 304 with less access delay. In another implementation, optimizers 206A-206N may further convert tables as stored in production database 104 into data sheets that are accessible through keys and store the data sheets in dispatcher database 304. The key-based search to the data sheets may further improve the access speed to the content stored in dispatcher database 304. Additionally, the dispatcher database 304 may serve as a back-up to production database 104 and make the data content available even if production database 104 is unavailable or corrupted.

Figure 6:
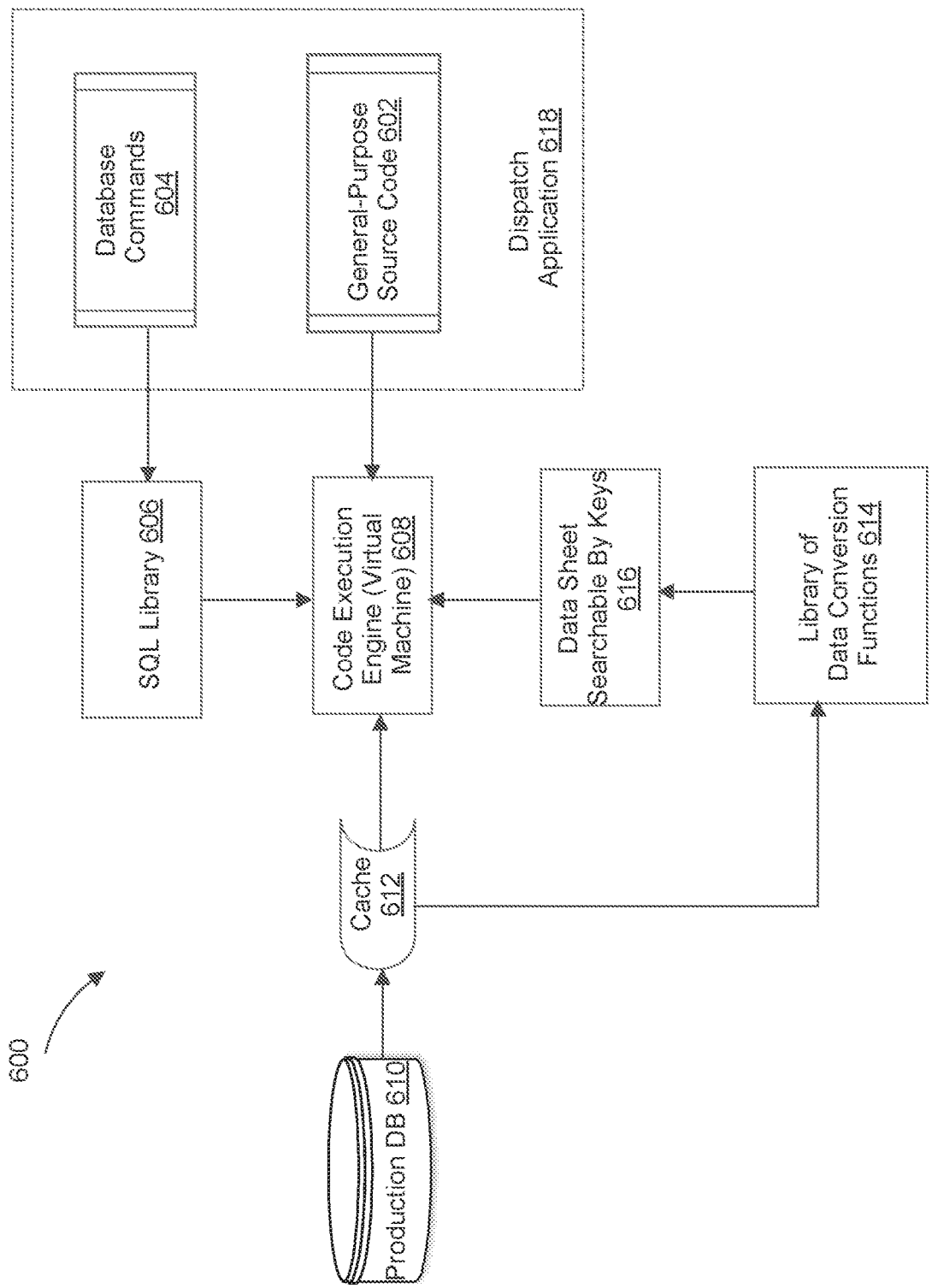
FIG. 6 is a system level diagram of the dispatcher system according to an implementation of the disclosure.

FIG. 6 is a system level diagram of the dispatcher system 600 according to an implementation of the disclosure. As shown in FIG. 6, a user may use rule editors to construct a dispatch application 618 based on a set of dispatch rules. The rules may be in the form of conditional execution statements (e.g., IF-THEN-ELSE), where the conditions are examined based on the current states of machines in the plant. To improve the efficiency of execution, dispatch application 618 may include both database commands 604 directed to production database 610 and source code 602 written in a general-purpose programming language (e.g., C, C++, Java, Python). Database commands 604 may include operations directed to production database 610; source code 602 may implement the flow of the dispatch application including condition statements, input and output statements, and user-defined functions. In one implementation, to further improve the speed and efficiency of execution, dispatcher system 600 may include a cache database 612 (referred to as dispatcher database) to mirror content of production database 610. Dispatch application 618 may retrieve data items from cache database 612 because the access to cache database 612 is significantly faster than the access to production database 610.

As discussed above, dispatcher system 600 may also provide a compiler or an interpreter that may convert the source code of application 618 into machine-executable code or bytecodes that may be executed by a code execution engine 608 (e.g., a virtual machine). To facilitate code execution, dispatcher system 600 may include a first application programming interface (API) of database command library 606 that translates database commands 604 into machine-executable code or bytecodes that can be executed by code execution engine 608. Dispatcher system 600 may further include a second API of a library of data conversion functions 614. Dispatcher system 600 may use the library of data conversion functions to convert tables stored in cache database 612 into data sheets that are searchable according to keys, thus further improving the speed and efficiency of execution of application 618. The results of executing dispatch application 618 can be production plans for machines in the plant. Dispatcher system 600 may store the production plans in production database 610 or submit the production plans to MES 102 for further processing.

Figure 4:
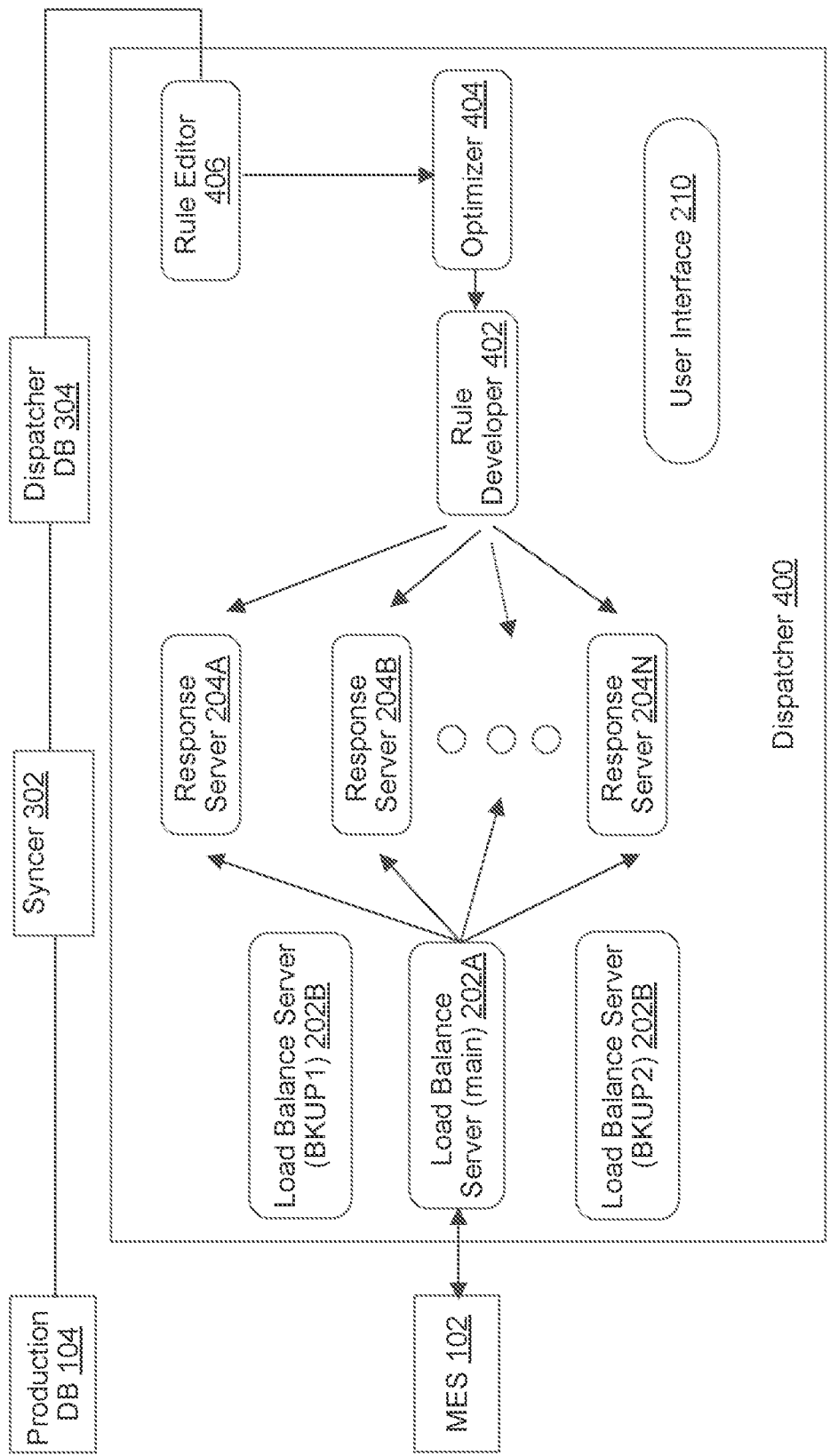
FIG. 4 illustrates a dispatcher system including a rule developer according to an implementation of the disclosure.

In one implementation, dispatcher system may further include a rule developer module for automatically generating rules. FIG. 4 illustrates a dispatcher system 400 including a rule developer 402 according to an implementation of the disclosure. As shown in FIG. 4, in addition to components as shown in FIG. 3, dispatcher system 400 may further include a rule editor 406, an optimizer 404, and a rule developer 402. A user may construct a dispatch application using rule editors 406 encoding a set of dispatch rules. Optimizers 404 may examine the code of the dispatch application and further optimize the execution efficiency and speed. Rule developer 402 may generate new rules based on a comparison of the optimized code and the application code. Dispatcher system 400 may store the new rules that may be used in future iterations of application execution.

Figure 5:
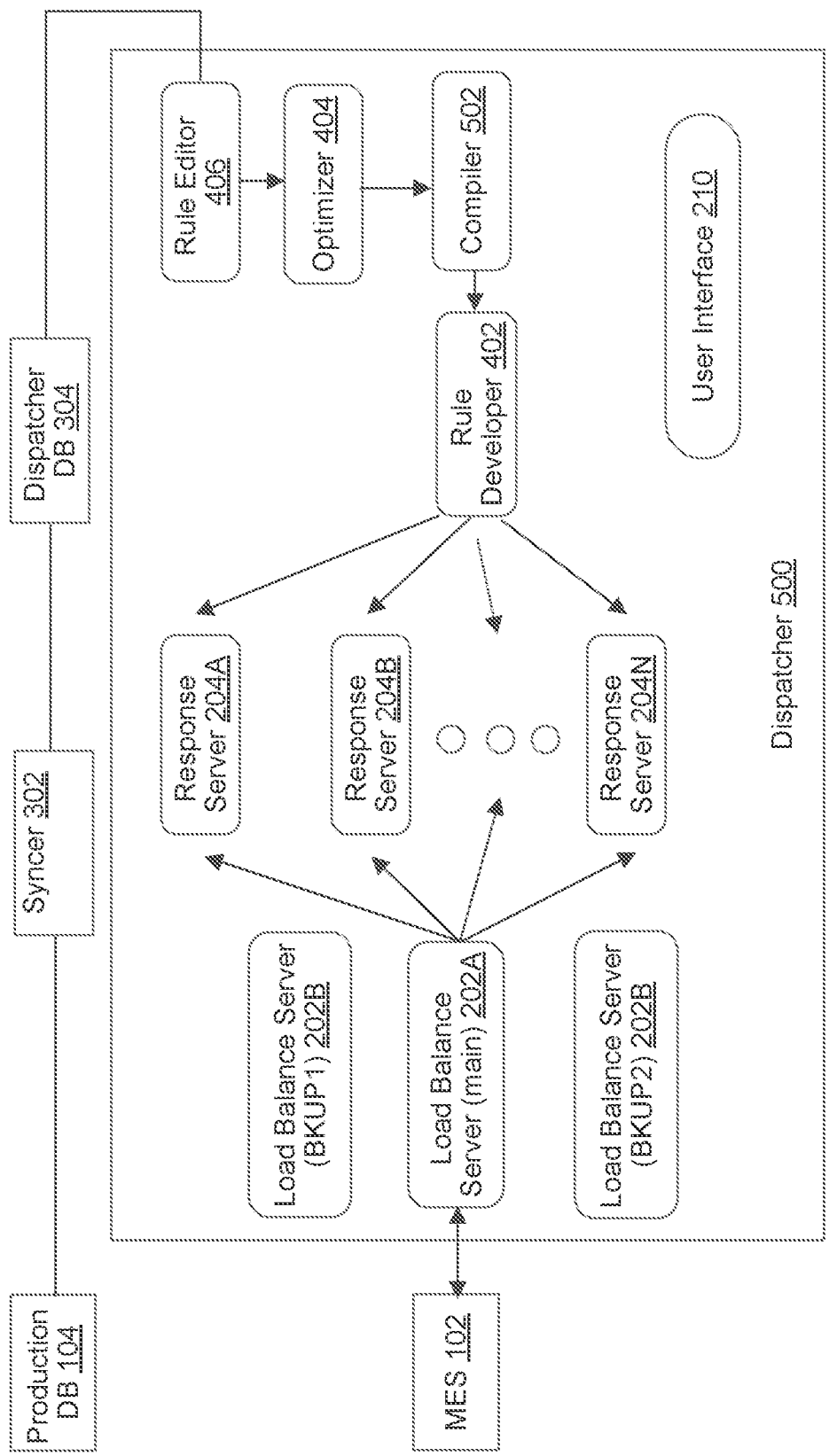
FIG. 5 illustrates a dispatcher system including source code optimization according to an implementation of the disclosure.

The code optimization can be a parser that examines the source code and optimizes in the source code level. After the optimization, a compiler or an interpreter may be used to generate machine executable code or bytecodes. FIG. 5 illustrates a dispatcher system 500 including source code optimization according to an implementation of the disclosure. As shown in FIG. 5, dispatcher system 500 may include a source code level optimizer 404 that may parse the source code of a dispatch application to generate a target optimized source code. Compiler (or interpreter) 502 may compile the target optimized source code into machine executable code (or bytecodes). Rule developer 402 may generate new rules based on a comparison of the optimized code and the application code.

Figure 7:
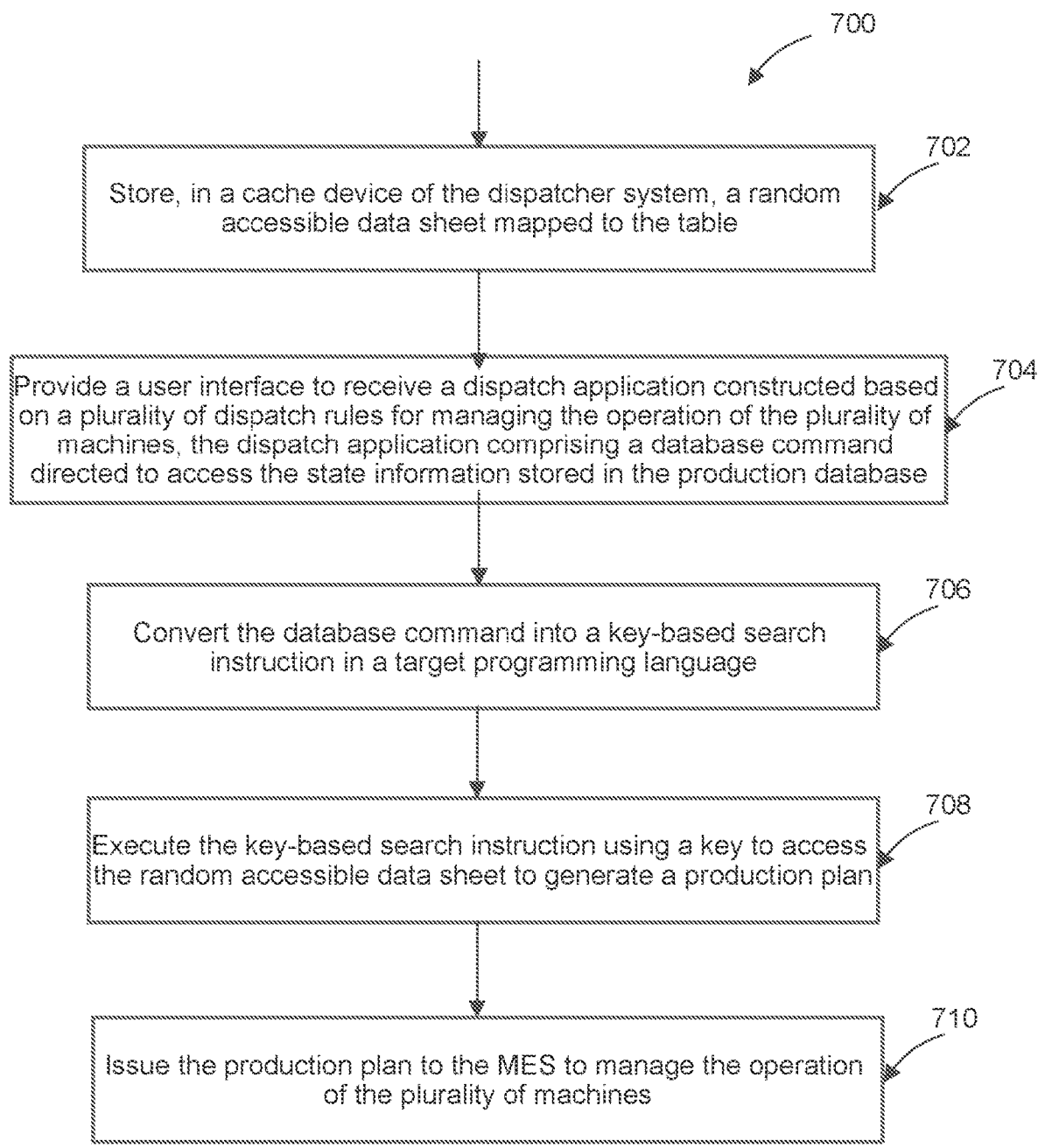
FIG. 7 depicts a flow diagram of a method 700 for operating a dispatcher system according to an implementation of the disclosure.

FIG. 7 depicts a flow diagram of a method 700 for operating a dispatcher system associated with a manufacture execution system (MES) of a plant, wherein the MES uses a production database storing a table containing state information of a plurality machines in the plant to manage operation of the plurality of machines. Method 700 may be performed by processing devices that may comprise hardware (e.g., circuitry, dedicated logic), computer readable instructions (e.g., run on a general purpose computer system or a dedicated machine), or a combination of both. Method 700 and each of its individual functions, routines, subroutines, or operations may be performed by one or more processors of the computer device executing the method. In certain implementations, method 700 may be performed by a single processing thread. Alternatively, method 700 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 700 may be performed by a processing device of MES 102 as shown in FIG. 1.

Referring to FIG. 7, at 702, the processing device may store, in a cache device of the dispatcher system, a random accessible data sheet mapped to the table.

At 704, the processing device may provide a user interface to receive a dispatch application constructed based on a plurality of dispatch rules for managing the operation of the plurality of machines, the dispatch application comprising a database command directed to access the state information stored in the production database.

At 706, the processing device may convert the database command into a key-based search instruction in a target programming language.

At 708, the processing device may execute the key-based search instruction using a key to access the random accessible data sheet to generate a production plan.

At 710, the processing device may issue the production plan to the MES to manage the operation of the plurality of machines.

FIG. 8 depicts a block diagram of a computer system 800 operating in accordance with one or more aspects of the present disclosure. In various illustrative examples, computer system 800 may correspond to a computing device within MES.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alpha-numeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions encoding the disclosed method in FIG. 7.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "determining," "updating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 800 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A dispatcher system associated with a manufacture execution system (MES) of a plant, wherein the MES uses a production database storing a table containing state information of a plurality machines in the plant to manage operation of the plurality of machines, the dispatcher system comprising:
    a cache device to store a random accessible data sheet mapped to the table; and
    a processing device, communicatively coupled to the cache device, to:
        receive a dispatch application constructed based on a plurality of dispatch rules for managing the operation of the plurality of machines, the dispatch application comprising a database command directed to access the state information stored in the production database;
        convert the database command into a key-based search instruction in a target programming language;
        execute the key-based search instruction using a key to access the random accessible data sheet to generate a production plan; and
        issue the production plan to the MES to manage the operation of the plurality of machines.

2. The dispatcher system of claim 1, wherein the processing device is to execute a synchronizer to copy the table from the production database to the cache device according to a schedule.

3. The dispatcher system of claim 2, wherein the processing device is to execute an optimizer to convert the table in the cache device into the data sheet in the cache device, and wherein each data item in the data sheet is paired with a corresponding key and searchable through the corresponding key.

4. The dispatcher system of claim 3, wherein to convert the database command into a key-based search instruction in a target programming language, the processing device is to convert the database command into the key-based search instruction in the target programming language using a first application programming interface (API), the first API comprising a first library of functions for converting a plurality of database commands into a corresponding plurality of key-based search instructions in the target programming language, and
    wherein to execute an optimizer to convert the table in the cache device into the data sheet in the cache device, the processing device is to execute the optimizer to convert the table in the cache device into the data sheet in the cache device using a second API comprising a second library of functions for converting the table to the data sheet.

5. The dispatcher system of claim 1, wherein the processing device is to:
    execute a code converter to a source code of the dispatch application into machine code; and
    execute a virtual machine to execute the machine code.

6. The dispatcher system of claim 5, wherein the code converter is one of a compiler or an interpreter, wherein the database command comprises a SQL database command, and the target programming language comprises at least one of C, Java, or Python, and wherein the machine code is one of a machine executable code or a bytecode.

7. The dispatcher system of claim 1, wherein the processing device is to provide a user interface for a user to construct source code of the dispatch application using the plurality of dispatch rules, and wherein the processing device is to:
provide a graphic rule editor comprising a plurality of graphic representations corresponding to a plurality of database commands that allow the user to construct a dispatch rule by connecting two or more of the plurality of graphic representations.

8. The dispatcher system of claim 1, wherein the plant is a semiconductor fabrication plant (FAB), and wherein the MES uses the plurality of dispatch rules to manage the plurality of machines, the plurality rules relating to at least one of wafers waiting to be processed by at least one of the plurality of machines, wafers being processed by at least one of the plurality of machines, or destination machines for wafers having been processed by at least one of the plurality of machines.

9. The dispatcher system of claim 1, further comprising:
a plurality of response servers for executing the dispatch application, wherein each of the plurality of response servers operates a corresponding one of the plurality of machines; and
a load balance server that manages a workload of the plurality of response servers.

10. A method for operating a dispatcher system associated with a manufacture execution system (MES) of a plant, wherein the MES uses a production database storing a table containing state information of a plurality machines in the plant to manage operation of the plurality of machines, the method comprising:
storing, in a cache device of the dispatcher system, a random accessible data sheet mapped to the table;
receiving, by a processing device of the dispatcher system, a dispatch application constructed based on a plurality of dispatch rules for managing the operation of the plurality of machines, the dispatch application comprising a database command directed to access the state information stored in the production database;
converting the database command into a key-based search instruction in a target programming language;
executing the key-based search instruction using a key to access the random accessible data sheet to generate a production plan; and
issuing the production plan to the MES to manage the operation of the plurality of machines.

11. The method of claim 10, further comprising executing a synchronizer to copy the table from the production database to the cache device according to a schedule.

12. The method of claim 11, further comprising executing an optimizer to convert the table in the cache device into the data sheet in the cache device, and wherein each data item in the data sheet is paired with a corresponding key and searchable through the corresponding key.

13. The method of claim 12, wherein converting the database command into a key-based search instruction in a target programming language comprises converting the database command into the key-based search instruction in the target programming language using a first application programming interface (API), the first API comprising a first library of functions for converting a plurality of database commands into a corresponding plurality of key-based search instructions in the target programming language, and wherein executing an optimizer to convert the table in the cache device into the data sheet in the cache device comprises executing the optimizer to convert the table in the cache device into the data sheet in the cache device using a second API comprising a second library of functions for converting the table to the data sheet.

14. The method of claim 10, further comprising:
executing a code converter to a source code of the dispatch application into machine code, wherein the code converter is one of a compiler or an interpreter; and
executing a virtual machine to execute the machine code, wherein the machine code is one of a machine executable code or a bytecode, wherein the database command comprises a SQL database command, and the target programming language comprises at least one of C, Java, or Python.

15. The method of claim 10, further comprising:
providing a user interface to receive the dispatch application to construct source code of the dispatch application using the plurality of dispatch rules, wherein providing the user interface comprises providing a graphic rule editor comprising a plurality of graphic representations corresponding to a plurality of database commands that allow a user to construct a dispatch rule by connecting two or more of the plurality of graphic representations.

16. The method of claim 10, wherein the plant is a semiconductor fabrication plant (FAB), and wherein the MES uses the plurality of dispatch rules to manage the plurality of machines, the plurality rules relating to at least one of wafers waiting to be processed by at least one of the plurality of machines, wafers being processed by at least one of the plurality of machines, or destination machines for wafers having been processed by at least one of the plurality of machines.

17. The method of claim 10, wherein the dispatcher system further comprises:
a plurality of response servers for executing the dispatch application, wherein each of the plurality of response servers operates a corresponding one of the plurality of machines; and
a load balance server that manages a workload of the plurality of response servers.

18. A manufacture execution system (MES), comprising:
a production database storing a table containing state information of a plurality machines in a plant managed by the MES;
a processing device, associated with a cache device to store a random accessible data sheet mapped to the table, the processing device is to execute a dispatcher system to:
provide a user interface to receive a dispatch application constructed based on a plurality of dispatch rules for managing the operation of the plurality of machines, the dispatch application comprising a database command directed to access the state information stored in the production database;
convert the database command into a key-based search instruction in a target programming language;
execute the key-based search instruction using a key to access the random accessible data sheet to generate a production plan; and issue the production plan to the MES to manage the operation of the plurality of machines.

19. The MES of claim 18, wherein the processing device is to execute a synchronizer to copy the table from the production database to the cache device according to a schedule.

20. The MES of claim 19, wherein the processing device is to execute an optimizer to convert the table in the cache device into the data sheet in the cache device, and wherein each data item in the data sheet is accessible by a corresponding key.

* * * * *